US012629665B2

(12) United States Patent
Tsuzuki et al.

(10) Patent No.: US 12,629,665 B2
(45) Date of Patent: May 19, 2026

(54) NANOCRYSTAL COMPOSITE

(71) Applicant: Furukawa Electric Co., Ltd., Tokyo (JP)

(72) Inventors: Yoshikazu Tsuzuki, Tokyo (JP); Mariko Wakae, Tokyo (JP); Satoshi Aoki, Tokyo (JP); Goro Miyoshi, Tokyo (JP); Hideki Abe, Tokyo (JP)

(73) Assignee: Furukawa Electric Co., Ltd., Tokyo (JP)

( * ) Notice: Subject to any disclaimer, the term of this patent is extended or adjusted under 35 U.S.C. 154(b) by 395 days.

(21) Appl. No.: 17/244,792

(22) Filed: Apr. 29, 2021

(65) Prior Publication Data

US 2021/0245141 A1 Aug. 12, 2021

Related U.S. Application Data

(63) Continuation of application No. PCT/JP2020/003581, filed on Jan. 31, 2020.

(30) Foreign Application Priority Data

Feb. 6, 2019 (JP) ................................. 2019-019657

(51) Int. Cl.
*B01J 35/45* (2024.01)
*B01D 53/94* (2006.01)
(Continued)

(52) U.S. Cl.
CPC .......... *B01J 23/72* (2013.01); *B01D 53/9418* (2013.01); *B01J 23/10* (2013.01); *B01J 35/45* (2024.01);
(Continued)

(58) Field of Classification Search
None
See application file for complete search history.

(56) References Cited

U.S. PATENT DOCUMENTS

2013/0274096 A1* 10/2013 Wu ...................... B01J 37/0045
502/439
2014/0323294 A1 10/2014 Nagao et al.
(Continued)

FOREIGN PATENT DOCUMENTS

CN 102407123 A 4/2012
CN 102489303 A 6/2012
(Continued)

OTHER PUBLICATIONS

Product Focus. "How SEM/EDS Works . . . ". 2023 (Year: 2023).*
(Continued)

*Primary Examiner* — Sheng H Davis
(74) *Attorney, Agent, or Firm* — Dorsey & Whitney LLP

(57) ABSTRACT

The present disclosure relates to a nanocrystal composite includes a connected aggregate including a plurality of nanocrystal fragments connected to one another, each nanocrystal fragment having a main surface and an end surface, and nanoparticles supported on the connected aggregate. The plurality of nanocrystal fragments each have a flaky shape; the plurality of nanocrystal fragments have gaps between the main surfaces; and the gaps G are arranged so as to open to the outside of the connected aggregate. The nanoparticles have a metallic element different from that of the plurality of nanocrystal fragments; and a proportion of a visual field area of the nanoparticles with respect to a visual field area of the plurality of nanocrystal fragments is 2% or more and 50% or less.

5 Claims, 4 Drawing Sheets

(51) Int. Cl.

| | | |
|---|---|---|
| *B01J 23/10* | (2006.01) | |
| *B01J 23/72* | (2006.01) | |
| *B01J 37/02* | (2006.01) | |
| *B01J 37/03* | (2006.01) | |
| *B01J 37/04* | (2006.01) | |
| *B01J 37/06* | (2006.01) | |

(52) U.S. Cl.
CPC ......... *B01J 37/0236* (2013.01); *B01J 37/031* (2013.01); *B01J 37/04* (2013.01); *B01J 37/06* (2013.01); *B01D 2255/2065* (2013.01); *B01D 2255/20715* (2013.01); *B01D 2255/20761* (2013.01)

(56) References Cited

U.S. PATENT DOCUMENTS

| | | | |
|---|---|---|---|
| 2016/0296915 | A1 | 10/2016 | Nagata et al. |
| 2018/0029012 | A1 | 2/2018 | Shen et al. |
| 2018/0133649 | A1 | 5/2018 | Tsuzuki et al. |
| 2020/0017367 | A1 | 1/2020 | Tsuzuki et al. |

FOREIGN PATENT DOCUMENTS

| | | | |
|---|---|---|---|
| CN | 103055859 | A | 4/2013 |
| CN | 105792931 | A | 7/2016 |
| CN | 107207274 | A | 9/2017 |
| CN | 108996477 | B | 2/2022 |
| EP | 3323507 | A1 | 5/2018 |
| JP | 2013034985 | A | 2/2013 |
| JP | 2013240756 | A | 12/2013 |
| JP | 2016059881 | A | 4/2016 |
| WO | 2017010492 | A1 | 1/2017 |
| WO | 2018164163 | A1 | 9/2018 |

OTHER PUBLICATIONS

Temming, Maria. "Scientists Say: 2-D material". ScienceNewExplores. 2024 (Year: 2024).*

English translation of International Preliminary Report on Patentability and Written Opinion for Application No. PCT/JP2020/003581, dated Aug. 10, 2021.

English translation of International Search Report and Written Opinion for Application No. PCT/JP2020/003581, dated Apr. 14, 2020.

Ferraz, Camila P. et al., "Furfural Oxidation on Gold Supported on MnO2: Influence of The Support Structure on The Catalytic Performances", Applied Sciences, vol. 8, No. 8, Jul. 2018, pp. 1-12.

Joo, Sang H. et al., "Ordered Nanoporous Arrays of Carbon Supporting High Dispersions of Platinum Nanoparticles", Nature, vol. 412, Jul. 12, 2001, pp. 169-172.

Kijima, Tsuyoshi et al., "Synthesis of Nanohole-Structured Single-Crystalline Platinum Nanosheets Using Surfactant-Liquid-Crystals and Their Electrochemical Characterization", Advanced Functional Materials, vol. 19, No. 4, Feb. 2009, pp. 545-553.

Wang, Chao et al., "A General Approach to the Size-and Shape-Controlled Synthesis of Platinum Nanoparticles and Their Catalytic Reduction of Oxygen", A Journal of the German Chemical Society, vol. 47, Apr. 2008, pp. 3588-3591.

Wang, Chao et al., "Synthesis of Monodisperse PT Nanocubes and Their Enhanced Catalysis for Oxygen Reduction", Journal of American Chemical Society, vol. 129, Jan. 20, 2007, pp. 6974-6975.

Zhang, Yangyang et al., "Ag2O Loaded NiO Ball-Flowers for High Performance Supercapacitors", Materials Letters, vol. 177, Aug. 16, 2016, pp. 71-75.

[English Translation] First Office Action dated Jan. 9, 2023 in CN Application No. 202080004110.9; pp. all.

Shanhong Zeng et al. "CeO2 nanoparticles supported on CuO with petal-like and sphere-flower morphologies for preferential CO oxidation", International Journal of Hydrogen Energy 37; received Mar. 28, 2012; pp. 11640-pp. 11649.

[English Translation] Yang Hui et al., "Preparation, Characterization and Catalysis of CuO Nanoflakes and Ball-like Nanostructures Self-assembly from Nanoflakes", School of Chemistry and Materials Science, Shaanxi Normal University, vol. 21, No. 12; Dec. 2009; pp. all.

[English Translation] Second Office Action mailed May 4, 2023 in CN Application No. 202080004110.9; pp. all.

Extended European Search Report for EP Application No. 20752012.3 mailed Sep. 14, 2022; pp. all.

Decision of Rejection for Chinese Patent Application No. 202080004110.9 dated Jul. 17, 2023, pp. all.

* cited by examiner

NANOCRYSTAL COMPOSITE

CROSS REFERENCE TO RELATED APPLICATIONS

This is a continuation application of International Patent Application No. PCT/JP2020/003581 filed Jan. 31, 2020, which claims the benefit of Japanese Patent Application No. 2019-019657 filed Feb. 6, 2019, and the full contents of all of which are hereby incorporated by reference in their entirety.

BACKGROUND

Technical Field

The present disclosure relates to a nanocrystal composite, and particularly relates to a nanocrystal composite capable of being repeatedly used while maintaining high catalytic activity in purification of harmful gases such as NO and CO contained in exhaust gas of automobiles.

Description of the Related Art

In order to reduce toxicity of harmful gases such as CO and NO contained in exhaust gas of automobiles, catalysts capable of efficiently converting these harmful gases into harmless gases such as $CO_2$ and $N_2$ have attracted attention in recent years from the viewpoint of environmental issues.

As such catalysts, precious metals such as Pt, Pd and Rh are generally used. However, these precious metals not only are expensive but also have problems of resource constraints, small distribution volume, and the like. Then, in order to enhance catalytic activity in a small amount, a technique of miniaturization to increase an area of a surface (surface area) causing catalytic reaction has been studied. That is, by changing a bulk metal catalyst from powders to a μm-sized crystals (microcrystals) or further to a nanoparticles to decrease the diameter and thereby increasing a surface area ($m^2/g$) per unit quantity, the catalytic reaction quantity can be increased, and the catalytic activity can be enhanced. As such a technique, nanomaterials such as nanosheets or nanoparticles composed of Pt (platinum) have been reported ((i) Joo, S. H.; Choi, S. J.; Oh, I.; Kwak, J.; Liu, Z.; Terasaki, O.; Ryoo, R.; Nature, 2001, 412, 169-172, (ii) Wang, C.; Daimon, H.; Lee, Y.; Kim, J.; Sun, S.; J. Am. Chem. Soc. 2007, 129, 6974-6975, (iii) Wang, C.; Daimon, H.; Onodera, T.; Koda, T.; Sun, S.; Angew. Chem., Int. Ed. 2008, 47, 3588-3591, and (iv) Kijima, T.; Nagatomo, Y.; Takemoto, H; Uota, M.; Fujikawa, D.; Sekiya, Y.; Kishishita, T.; Shimoda, M.; Yoshimura, T.; Kawasaki, H.; Sakai, G.; Adv. Funct. Mater. 2009, 19, 1055-1058).

However, there has been a problem that the nanoparticles (primary particles) agglomerate together and easily become agglomerated particles (secondary particles). When the nanoparticles become agglomerated particles, the surface area per unit quantity becomes almost equal to that of the bulk metal catalyst, and the catalytic activity also becomes the same level, so that it becomes impossible to achieve the function of enhancement of catalytic activity.

In order to solve the problem of the agglomerated particles, a medium in which nanoparticles composed of a precious metal such as Pt are dispersed on a surface of a particulate base composed of $SiO_2$ or the like has been studied. However, even if the nanoparticles are dispersed on the surface of the particulate base, there occurs a problem that when the medium is used at high temperature, the nanoparticles move, diffuse and unite together into coarse particles. By the uniting and coarsening of the nanoparticles, the surface area per unit quantity becomes almost equal to that of a bulk body, and the catalytic activity also becomes the same level, so that it becomes impossible to achieve the function of enhancement of catalytic activity, similarly to the problem of the agglomerated particles.

In order to suppress lowering of the catalytic activity caused by the uniting and coarsening of the nanoparticles, an aggregated catalyst of nano single crystal plate materials (nanoflower) which have a specific plane of a specific single crystal as one plane, and which are aggregated without contact of catalytically active planes with each other between the adjacent nano single crystal plate materials has been proposed (Japanese Patent Application Laid-Open No. 2013-240756). In Japanese Patent Application Laid-Open No. 2013-240756, it is disclosed that by using the aggregated catalyst of nano single crystal plate materials, the catalytically active planes are not brought into contact with each other and a space (gap) is secured in front of the catalytically active plane even if the nanoparticles unite together, and lowering of catalytic activity due to the uniting and coarsening of the nanoparticles can be suppressed, so that the catalytic activity can be enhanced. In Japanese Patent Application Laid-Open No. 2013-240756, moreover, it is disclosed that by using a catalytically active (001) plane of a nano single crystal plate CuO material that is a transition metal oxide, the catalytic reaction in the aforesaid purification of harmful gases can be efficiently carried out.

On the other hand, when the aggregated catalyst of nano single crystal plate materials (nanoflower) is used in the aforesaid purification of harmful gases, it is desirable that the catalyst be able to be used while maintaining high catalytic activity even if it is repeatedly exposed to a high temperature, in order to efficiently progress the catalytic reaction.

SUMMARY

The present disclosure is related to providing a nanocrystal composite capable of favorably maintaining high catalytic activity even if it is repeatedly exposed to a high temperature.

According to an aspect of the present disclosure, a nanocrystal composite includes a connected aggregate including a plurality of nanocrystal fragments connected to one another, each nanocrystal fragment having a main surface and an end surface, and nanoparticles supported on the connected aggregate. The plurality of nanocrystal fragments each have a flaky shape; the plurality of nanocrystal fragments have gaps between the main surfaces; and the gaps are arranged so as to open to the outside of the connected aggregate. The nanoparticles have a metallic element different from that of the plurality of nanocrystal fragments; and a proportion of a visual field area of the nanoparticles with respect to a visual field area of the plurality of nanocrystal fragments is 2% or more and 50% or less.

In one embodiment of the present disclosure, a particle diameter of each of the nanoparticles is 5 nm or more and 100 nm or less; and the nanoparticles are arranged on the main surfaces.

In one embodiment of the present disclosure, the plurality of nanocrystal fragments are a first kind metal oxide; and the nanoparticles are a second kind metal oxide different from the first kind metal oxide.

In one embodiment of the present disclosure, the first kind metal oxide is copper oxide.

In one embodiment of the present disclosure, the second kind metal oxide is a cerium oxide nanoparticle or a nanoparticle of a mixture of cerium oxide and zirconium oxide.

In one embodiment of the present disclosure, the nanocrystal composite is applied in oxidation-reduction catalytic reaction.

In one embodiment of the present disclosure, the nanocrystal composite is applied as a catalyst for exhaust gas purification.

According to the present disclosure, the nanocrystal composite capable of favorably maintaining high catalytic activity even if it is repeatedly exposed to a high temperature can be provided.

DETAILED DESCRIPTION

Hereinafter, the nanocrystal composite that is an embodiment of the present disclosure will be described with reference to the drawings.
<Nanocrystal Composite>

The nanocrystal composite according to the present disclosure includes a connected aggregate including a plurality of nanocrystal fragments connected to one another, each nanocrystal fragment having a main surface and an end surface, and nanoparticles supported on the connected aggregate. The plurality of nanocrystal fragments each have a flaky shape; the plurality of nanocrystal fragments have gaps between the main surfaces; and the gaps are arranged so as to open to the outside of the connected aggregate. The nanoparticles supported on the connected aggregate have an element different from that of the plurality of nanocrystal fragments. In order to appropriately control the quantity of the nanoparticles supported on the connected aggregate, the proportion of a visual field area of the nanoparticles with respect to a visual field area of the plurality of nanocrystal fragments is 2% or more and 50% or less.

Figure 1:
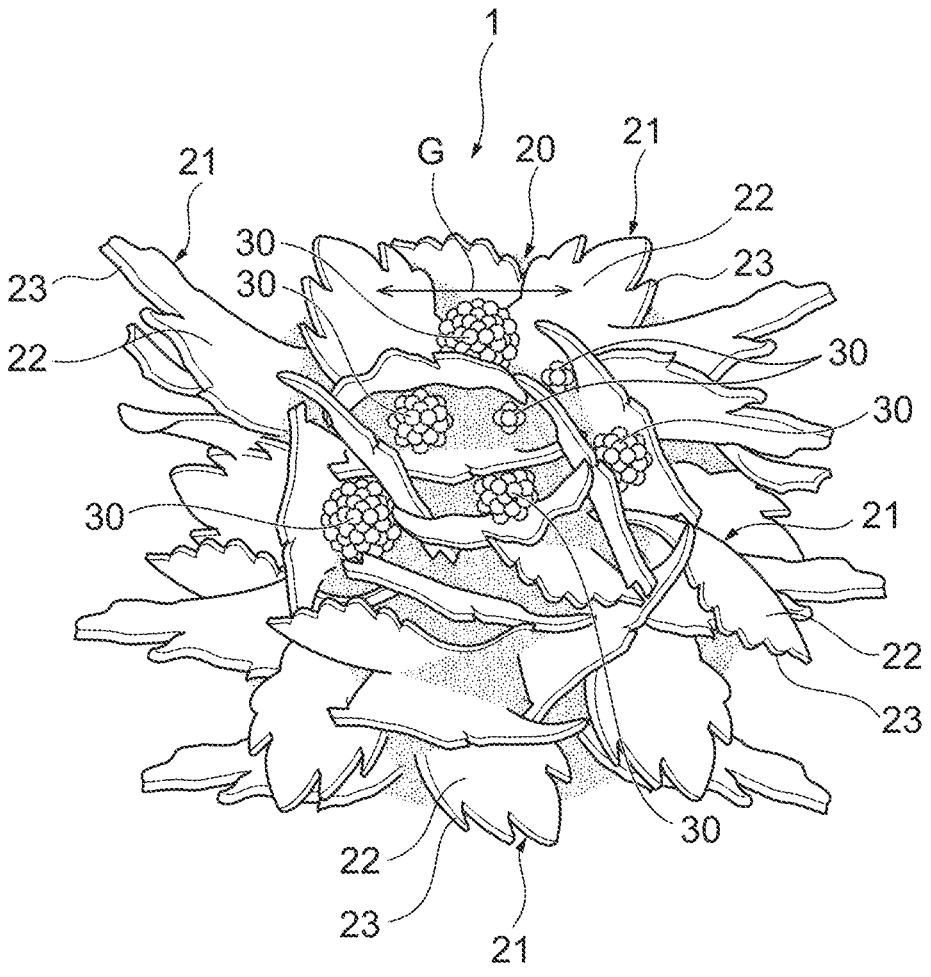
FIG. 1 is a schematic perspective diagram showing one embodiment of the nanocrystal composite according to the present disclosure.

FIG. 1 is a schematic perspective diagram showing an example of the nanocrystal composite that is an embodiment of the present disclosure. As shown in FIG. 1, the nanocrystal composite 1 according to the present disclosure has a connected aggregate 20 in which a plurality of nanocrystal fragments 21 each having a main surface 22 and an end surface 23 are connected to one another, and shows a flower-like shape. The state of the connection of the plurality of nanocrystal fragments 21 is not particularly limited, and it is enough that the plurality of nanocrystal fragments 21 are connected to one another to form an aggregate.

The nanocrystal fragment 21 has a flaky shape in which the thickness of the end surface 23 is thin as compared with the size of the main surface 22. On the outer surface of the connected aggregate 20, a gap G is formed between the main surfaces 22 of the plurality of nanocrystal fragments 21 adjacent to each other, and this gap G is arranged so as to open to the outside of the connected aggregate 20.

Here, the main surface of the nanocrystal fragment 21 specifically refers to a surface having a large surface area among the outer surfaces of the nanocrystal fragment 21 of a flaky shape, and means each of both surfaces that partitively form upper and lower edges of the end surfaces having small surface areas. For example, when the nanocrystal composite 1 is utilized for catalytic reaction, the main surface 22 becomes a catalytically active plane showing high catalytic activity. On that account, as the surface area of the main surface 22 increases, the catalytic reaction can be more efficiently carried out.

It is preferable that the minimum dimension of the main surface 22 of the nanocrystal fragment 21 be 10 nm or more and less than 1 μm, and it is preferable that the thickness t of the nanocrystal fragment 21 be 1/10 or less of the minimum dimension of the main surface 22. Thus, the area of the main surface 22 of the nanocrystal fragment 21 can be made about 10 times or more as large as the area of the end surface 23, and the catalytic activity per unit quantity can be increased as compared with the nanoparticles. If the minimum dimension of the main surface 22 is set to 1 μm or more, it becomes difficult to connect the nanocrystal fragments 21 with high density, and if the minimum dimension is set to less than 10 nm, there is concerned that the gap G cannot be formed between the main surfaces 22 of the plurality of nanocrystal fragments 21 adjacent to each other. In order to suppress lowering of rigidity of the nanocrystal fragment 21 in the thickness direction of the nanocrystal fragment 21, it is preferable that the thickness t of the nanocrystal fragment 21 be 1 nm or more. The dimension of the main surface 22 of the nanocrystal fragment 21 can be determined by measuring, as an individual nanocrystal fragment, the nanocrystal fragment 21 that has been separated from the connected aggregate 20 in such a manner that the shape of the nanocrystal fragment 21 is not impaired. In a specific example of the measuring method, a rectangle Q circumscribing the main surface 22 of the nanocrystal fragment 21 and having a minimum area is drawn, and a short side L1 and a long side L2 of the rectangle Q are measured as the minimum dimension and the maximum dimension of the nanocrystal fragment 21, respectively.

It is preferable that the nanocrystal fragment 21 be a first kind metal oxide. Here, examples of the first kind metal oxides include oxides of precious metals, transition metals or their alloys, and their composite oxides. Examples of the precious metals and their alloys include metals each being composed of one component selected from the group of palladium (Pd), rhodium (Rh), ruthenium (Ru), platinum (Pt), silver (Ag) and gold (Au), and alloys containing one or more components selected from the group of them. Examples of the transition metals and their alloys include metals each being composed of one component selected from the group of copper (Cu), nickel (Ni), cobalt (Co) and zinc (Zn), and alloys containing one or more components selected from the group of them.

It is preferable that the first kind metal oxide be particularly a metal oxide containing one or two or more metals selected from the group of transition metals. Since such metal oxides abundantly exist on the earth as metal resources and are inexpensive as compared with precious metals, they are preferable from the viewpoint of price controls. It is preferable that the first kind metal oxide be a metal oxide containing one or two or more metals selected from the group of Cu, Ni, Co and Zn, among them, and it is more preferable that such a metal oxide contain at least copper. Examples of the metal oxides containing copper include copper oxide, Ni—Cu oxide and Cu—Pd oxide, and of these, copper oxide (CuO) is preferable.

It is preferable that the nanocrystal composite 1 of the present disclosure have nanoparticles 30 supported on the connected aggregate 20 and the nanoparticles 30 be dispersedly supported, as shown in FIG. 1. The nanoparticles 30 may be supported in the gaps G or may be supported outside the gaps G (for example, on the end surface 23 of the nanocrystal fragment 21), but from the viewpoint of holding the nanoparticles 30 on the connected aggregate 20, it is preferable that they be supported in the gaps G. The nanoparticles 30 each have a metallic element different from that of the plurality of nanocrystal fragments 21, and it is preferable that the nanoparticles 30 be each a second kind metal oxide that is different from the first kind metal oxide. It is preferable that such a second kind metal oxide be, for example, a metal oxide containing cerium (Ce), and it is more preferable that the second kind metal oxide be a cerium oxide nanoparticle or a nanoparticle of a mixture of cerium oxide and zirconium oxide. When the nanoparticle 30 is a nanoparticle of cerium oxide or a mixture of cerium oxide and zirconium oxide (these are also collectively referred to as "CeO$_2$ nanoparticles" hereinafter), the CeO$_2$ nanoparticles have a property of holding oxygen, and therefore, if a nanocrystal composite 1 in which CeO$_2$ nanoparticles have been supported is used as a catalyst at a high temperature (e.g., 600° C.) in the catalytic reaction for converting a harmful gas such as CO or NO into a harmless gas such as CO$_2$ or N$_2$, the CeO$_2$ nanoparticles can temporarily hold an oxygen atom having been released from NO contained in the harmful gas and can supply this oxygen atom to the first kind metal oxide (e.g., CuO) before an oxygen atom is released from the first kind metal oxide. That is, the CeO$_2$ nanoparticles receive and release an oxygen atom, and exhibit a buffer action for relaxing release of an oxygen atom from the first kind metal oxide. On that account, the morphology of structure of the first kind metal oxide that forms the catalytically active plane of the nanocrystal fragment is maintained, whereby the catalytically active plane can maintain high catalytic activity. As a result, even if the catalytic reaction is repeatedly carried out at a high temperature, the nanocrystal composite 1 can be used while maintaining high catalytic activity. When the nanocrystal composite 1 is utilized for the catalytic reaction, it is preferable that the nanoparticles 30 be arranged on the main surfaces 22 showing high catalytic activity in order to allow the nanoparticles to efficiently exhibit such a buffer action.

It is necessary to appropriately control the quantity of the nanoparticles 30 so that the nanoparticles 30 may be favorably supported on the connected aggregate 20. In the present disclosure, the proportion of a visual field area of the nanoparticles 30 (second kind metal oxide) with respect to a visual field area of the plurality of nanocrystal fragments 21 (first kind metal oxide) (visual field area ratio) is 2% or more and 50% or less, preferably 3% or more and 40% or less, and more preferably 4% or more and 30% or less. Here, the visual field area of the plurality of nanocrystal fragments 21 and the visual field area of the nanoparticles 30 each mean an area in the visual field when the plurality of nanocrystal fragments 21 and the nanoparticles 30 are observed by a means capable of confirming the plurality of nanocrystal fragments 21 and the nanoparticles 30, such as a microscope that realizes magnification at which the shapes can be visually confirmed, and for example, by carrying out elemental mapping of the plurality of nanocrystal fragments 21 (first kind metal oxide) and the nanoparticles 30 (second kind metal oxide) using SEM-EDS (energy dispersive X-ray spectroscopy), the visual field area ratio can be calculated. By controlling the proportion of the nanoparticles 30 with respect to the plurality of nanocrystal fragments 21 to be within a specific range on the basis of the visual field area ratio, as described above, the nanoparticles 30 can be favorably supported on the connected aggregate 20. If the visual field area ratio is less than 2%, the quantity of the nanoparticles 30 supported on the connected aggregate 20 is too small, and therefore, the aforesaid buffer action does not properly work. On that account, if the catalytic reaction is repeatedly carried out at a high temperature, the morphology of structure of the catalytically active plane collapses, and the nanocrystal composite 1 cannot maintain high catalytic activity. On the other hand, if the visual field area ratio exceeds 50%, agglomeration of the nanoparticles 30 with one another is marked, and it is impossible to allow the connected aggregate 20 to support the nanoparticles 30. Particularly if the visual field area ratio exceeds 80%, agglomerates of the nanoparticles 30 occupy the main surface 22 that is a catalytically active plane of the nanocrystal fragment 21, thereby conspicuously lowering the catalytic activity, and therefore, it becomes difficult to achieve the desired NO conversion even if the catalytic reaction is carried out at a high temperature.

The nanoparticles 30 to be supported on the connected aggregate 20 are preferably secondary particles, but primary particles may be contained. The particle diameter (secondary particle diameter) of the nanoparticles 30 is not particularly limited as long as the secondary particles can be supported on the connected aggregate 20, but it is preferable that the particle diameter be 5 nm or more and 100 nm or less, and it is more preferable that the particle diameter be 20 nm or more and 50 nm or less. If the particle diameter of the nanoparticles 30 is too large, supporting of the nanoparticles 30 on the connected aggregate 20, or further, in the gaps G, becomes difficult, and if the particle diameter of the nanoparticles 30 is too small, holding of the nanoparticles 30 on the connected aggregate 20, particularly between the gaps G, becomes difficult. Although the measurement of the secondary particle diameter is not particularly limited, the diameter can be measured by, for example, an electron microscope (scanning electron microscope: SEM). Moreover, it is preferable that the nanoparticles 30 be dispersedly present in a proportion of 1 to 2 particles with respect to 20 nanocrystal fragments 21. When the nanocrystal fragment is, for example, CuO, the morphology of the nanocrystal fragment can be stably maintained without decomposition of the CuO crystal into Cu$_2$O or Cu, by virtue of such dispersed presences.

A raw material of the first kind metal oxide and a raw material of the second kind metal oxide are not particularly limited, but as described in the method for producing a nanocrystal composite described later, the method includes a step of dissolving these raw materials in a prescribed aqueous solution, and therefore, it is preferable that these raw materials be hydrates containing metals that form the first kind metal oxide and the second kind metal oxide, and it is more preferable that these raw materials be hydrates of metal halides that form the first kind metal oxide and the second kind metal oxide.

When the nanocrystal composite 1 of the present disclosure is used as a catalyst, it is preferable that the main surface 22 of the nanocrystal fragment 21 be formed so as to have a specific crystal orientation, in order that the main surface 22 of the nanocrystal fragment 21 may become a catalytically active plane.

In order to form the main surface 22 of the nanocrystal fragment 21 as an active plane for reduction reaction, it is enough that a plane of a metal atom exhibiting catalytic activity in the first kind metal oxide is orientated so as to be positioned on the main surface 22, and the main surface 22 is composed of the metal atomic plane, and specifically, it is preferable that the proportion of the number of metal atoms that compose the main surface 22 of the first kind metal oxide with respect to the number of metal atoms and oxygen atoms be set to 80% or more.

On the other hand, in order to form the main surface 22 of the nanocrystal fragment 21 as s an active plane for oxidation reaction, it is enough that a plane of an oxygen atom exhibiting catalytic activity in the first kind metal oxide is orientated so as to be positioned on the main surface 22, and the main surface 22 is composed of the oxygen atomic plane, and specifically, it is preferable that the proportion of the number of oxygen atoms that compose main surface 22 of the first kind metal oxide with respect to the total number of metal atoms and oxygen atoms be set to 80% or more.

According to the role of the active plane, by adjusting the proportion of the number of metal atoms or oxygen atoms composing the main surface 22 of the nanocrystal fragment 21 with respect to the total number of metal atoms and oxygen atoms, the catalytic activity function of the main surface 22 can be enhanced, and sufficient catalytic activity can be exhibited not only as the nanocrystal fragment 21 but also as the nanocrystal composite 1.

The reason why the main surface 22 of the nanocrystal fragment 21 has a specific crystal orientation is that many crystal orientations present on the main surface 22 differ from one another according to the type of the first kind metal oxide that forms the nanocrystal fragment 21. On that account, though the crystal orientation of the main surface 22 is not specifically described, when the first kind metal oxide is, for example, copper oxide (CuO), it is preferable that the main crystal orientation of the single crystal that forms the main surface, that is, the active plane, be the (001) plane.

Moreover, in the structure in which the main surface 22 is the metal atomic plane, it is preferable that the crystal structure of the first kind metal oxide be an ordered structure in which metal atomic planes and oxygen atomic planes are alternately stocked with the ordered atomic arrangement, and be formed in such a manner that the metal atomic plane is positioned on the main surface 22. Specifically, included is not only a case of a structure in which the main surface 22 is formed of an aggregate of single crystals having the same orientations but also a case where a metal atomic plane is present on the main surface 22 even if the structure is a structure formed of an aggregate of single crystals having different crystal structures or different orientations, or an aggregate containing a crystal grain boundary, a polycrystal or the like.

The nanocrystal composite according to the present disclosure can be used for various purposes, and for example, it can be preferably used for oxidation-reduction catalytic reaction, particularly as a catalyst for exhaust gas purification.

<Method for Producing Nanocrystal Composite>

Next, the method for producing a nanocrystal composite according to the present disclosure will be described. The method for producing a nanocrystal composite, which is an embodiment of the present disclosure, has a mixing step S1 and a temperature/pressure application step S2.

(Mixing Step S1)

The mixing step is a step in which a hydrate of a compound containing a precious metal, a transition metal or an alloy thereof, particularly a hydrate of a metal halide, which is a raw material of the first kind metal oxide, a hydrate of a compound containing Ce, particularly a hydrate of a Ce halide, which is a raw material of the second kind metal oxide, and an organic compound having a carbonic acid diamide skeleton for forming a ligand of a metal complex that is a precursor of the first kind metal oxide are dissolved in an aqueous solution (water). The hydrate of a metal halide is, for example, copper (II) chloride dihydrate; the hydrate of a Ce halide is, for example, cerium (III) chloride heptahydrate; and the organic compound having a carbonic acid diamide skeleton is, for example, urea. When a mixture of cerium oxide and zirconium oxide is prepared, cerium (III) chloride heptahydrate and zirconium oxychloride octahydrate can be mentioned as the raw materials of the second kind metal oxide.

It is preferable to mix the above hydrates and urea after addition of an organic solvent to the aqueous solution (water). As the organic solvent, ethylene glycol or the like can be used, and it is preferable to add the organic solvent in such a manner that the concentration becomes 50 mol % or less based on the aqueous solution. Thus, the dispersibility of solutes can be enhanced.

(Hydrothermal Synthesis Step S2)

The hydrothermal synthesis step is a step in which to the resulting mixed solution, prescribed heat and pressure are applied, and the solution is allowed to stand for a prescribed time. It is preferable to heat the mixed solution at 100° C. or higher and 300° C. or lower. If the heating temperature is lower than 100° C., the reaction of urea with the metal halide cannot be completed, and if the heating temperature exceeds 300° C., the reaction vessel cannot withstand a high vapor pressure generated. It is preferable that the heating time be 10 hours or more. If the heating time is less than 10 hours, unreacted materials sometimes remain. It is preferable that the prescribed pressure be a pressure of vapor pressure of water (1 atm) or higher at 100° C. In order to apply the prescribed heat and pressure, a method of applying heat and pressure using, for example, a pressure vessel can be mentioned.

Through the above steps, not only is a nanocrystal composite produced but also the nanocrystal composite 1 according to the present disclosure in which the nanoparticles 30 have been supported on the connected aggregate 20 of the nanocrystal composite 1 can be produced.

The embodiments of the present disclosure are described hereinbefore, but the present disclosure is not limited to the above embodiments, and all aspects included in the concept of the present disclosure and the scope of claims are included, and various modifications may be made within the scope of the present disclosure.

Examples

Next, the present disclosure will be described in more detail based on Examples, but the present disclosure is in no way limited to those Examples.

Examples 1 to 4, Comparative Examples 1 to 4

At room temperature, 150 ml of ethylene glycol and 150 ml of water were mixed and stirred for one hour to prepare an aqueous solution. Subsequently, to the aqueous solution, cerium (III) chloride heptahydrate, copper (II) chloride dihydrate and urea were added in the prescribed amounts added shown in Table 1. The resulting solution was poured into a pressure vessel having an internal volume of 500 ml, and the vessel was tightly closed in an air atmosphere. The pressure vessel was set in a constant temperature bath, heated and maintained at 180° C. for 24 hours, and then cooled down to room temperature. The vessel was maintained at room temperature for one day, and then the solution containing precipitates was recovered from the vessel. The precipitates in the solution were washed with methanol and pure water and then dried at 70° C. for 10 hours in a vacuum environment, thereby preparing nanocrystal composites. [Measurement and Evaluation]

Using the nanocrystal composites of the Examples and the Comparative Examples obtained as above, measurement and property evaluation shown below were carried out. The measurement and the evaluation conditions for each property are as follows. The results are set forth in Table 1.

[1] Visual Field Area Ratio

Regarding the nanocrystal composite obtained in each of the Examples and the Comparative Examples, elemental mappings of copper oxide (CuO) that was the first kind metal oxide and cerium oxide nanoparticle ($CeO_2$ nanoparticle) that was the second kind metal oxide were carried out by EDS (energy dispersive X-ray spectroscope; "SU-8020" manufactured by Hitachi High-Technologies Corporation), and a proportion of a visual field area of the $CeO_2$ nanoparticles with respect to a visual field area of CuO (visual field area ratio) was measured. Specifically, the observation magnification was set to 20,000 times, a visual field of 3 μm×6 μm was taken as one visual field, and from the information on elemental peaks detected by the EDS, the element distributions of a cerium (Ce) element, a copper (Cu) element, and an oxygen (O) element were color-coded. Subsequently, two-dimensional image elemental mapping was carried out, and areas (visual field areas) corresponding to the Ce element and the Cu element are calculated. The calculated area of the Ce element was divided by the calculated area of the Cu element, and the resulting value is taken as a proportion of the visual field area of the second kind metal oxide with respect to the visual field area of the first kind metal oxide. By the above operations, mappings of 10 visual fields in total, the visual fields being those selected at random and 10 μm or more apart from one another, were carried out, then a mean value of the resulting ratios of the visual field areas was determined, and this was taken as a visual field area ratio.

[2] Catalytic Performance

Evaluation of catalytic performance was carried out using an apparatus including a gas supply line, a reaction tube and a gas sampling section. Specifically, the evaluation is as follows.

First, as a catalyst, 10 to 20 mg of the nanocrystal composites obtained in each of the Examples and the Comparative Examples was filled between glass filters, and inserted into the reaction tube. Thereafter, the reaction tube filled with the catalyst was set in the apparatus in a constant temperature bath. In order to remove influence of moisture adhering to the sample surface, the sample was heated up to 200° C. from room temperature for 30 minutes in a state of helium flow, and then the temperature was lowered down to 100° C. for the evaluation. Thereafter, the gas was changed to a reaction gas (raw material gas), and the reaction gas was maintained for 15 minutes, and when the gas was heated up to 600° C. at 10° C./min, the reaction tube exit gas was collected and measured, thereby calculating an NO conversion rate. Specifically, the NO conversion rate was calculated from the following equation (1).

$$NO \text{ conversion rate } (\%) = \{N_2(exit)/NO(raw \text{ material gas})\} \times 100 \qquad (1)$$

As the raw material gas, a mixed gas (helium balance) of 1 vol % carbon monoxide (CO) and 1 vol % nitrogen monoxide (NO) was used, and the flow rate was set to 20 mL/min. The reaction tube exit gas was measured by GC-MASS, and from the NO conversion rate, catalytic performance was evaluated. A case where the NO conversion rate was 50% or more was evaluated as pass "O", and a case where the NO conversion rate was less than 50% was evaluated as fail "x". The NO conversion rate referred to herein means a value of NO decreased by reduction when the catalyst is activated by heating, the value being on the basis of the NO gas concentration of the changed reaction gas at 100° C.

If the nanocrystal composite obtained in each of the examples and the comparative examples is subjected to catalytic reaction at 600° C., the structure and the structural morphology of copper oxide cannot be maintained, and in the catalytic reaction of the second time or after, there is concern about deterioration of catalytic activity. On that account, after the catalytic reaction of the first time, the nanocrystal composite obtained in each of the examples and the comparative examples was cooled down to 100° C. and then heated to 600° C. again, and the catalytic performance was evaluated again.

[3] Structure Observation

Figure 2A:
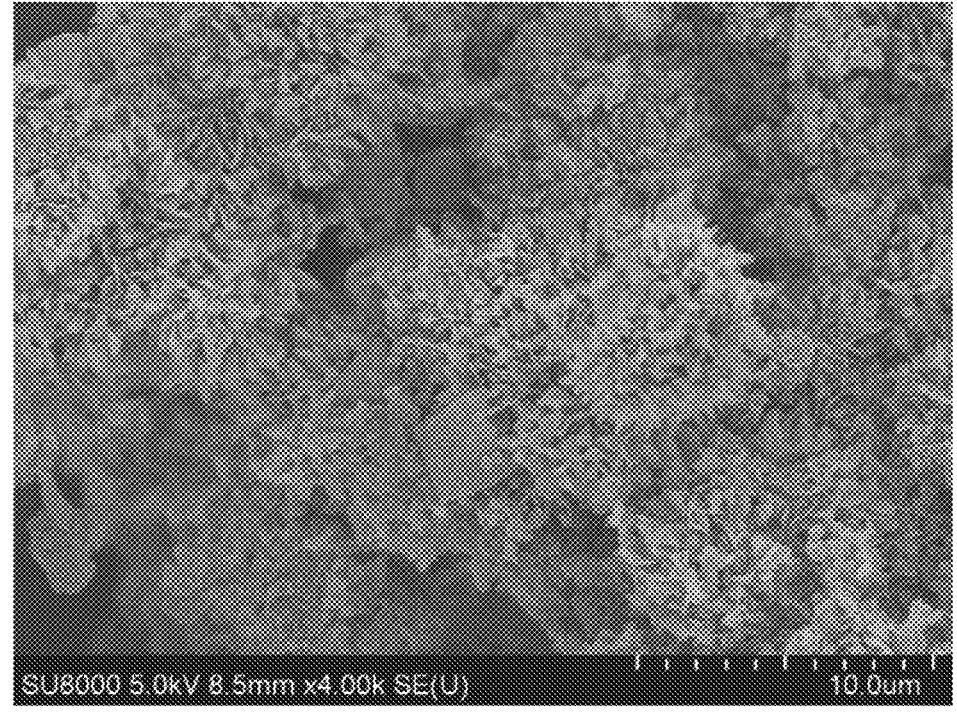
FIG. 2A is an SEM image obtained when nanocrystal composites after the first catalyst evaluation at 600° C. in Example 2 were observed at 4000× magnification.
Figure 2B:
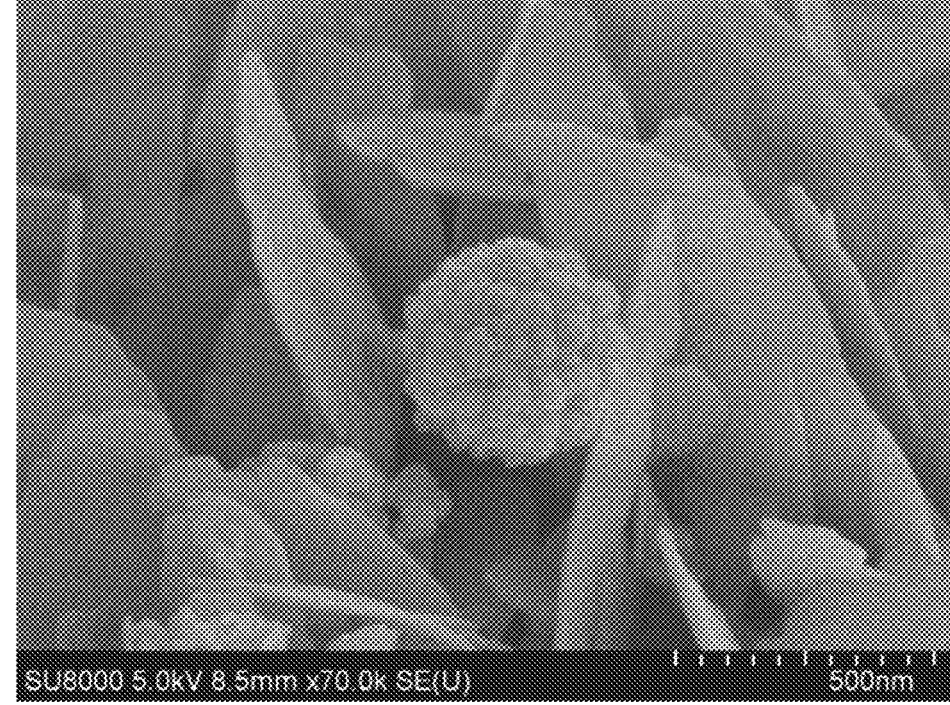
FIG. 2B is an SEM image obtained when the nanocrystal composites were observed at 70000× magnification.

Structure observation of the nanocrystals was carried out using a scanning electron microscope (SEM: "SU-8020" manufactured by Hitachi High-Technologies Corporation). FIG. 2(a) is an SEM image obtained when nanocrystal composites after the first catalyst evaluation at 600° C. in Example 2 were observed at 4000× magnification, and FIG. 2(b) is an SEM image obtained when the nanocrystal composites were observed at 70000× magnification.

[4] Structure Stability in Catalytic Reaction

Structure analysis by an X-ray diffraction apparatus ("D8 DISCOVER" manufactured by Bruker AXS K.K. (currently Bruker Japan K.K.)) was carried out. Through the X-ray crystal structure analysis, identification of the composition of the nanocrystal composite of each of the examples and the comparative examples after the catalytic reaction was carried out, and whether the crystal structure of copper oxide could be maintained or not was confirmed. A case where the crystal structure of copper oxide could be maintained was evaluated as "O" that was a case where CuO was present, and a case where the crystal structure of copper oxide could not be maintained was evaluated as "x" that was a case where decomposition of CuO occurred.

Figure 3:
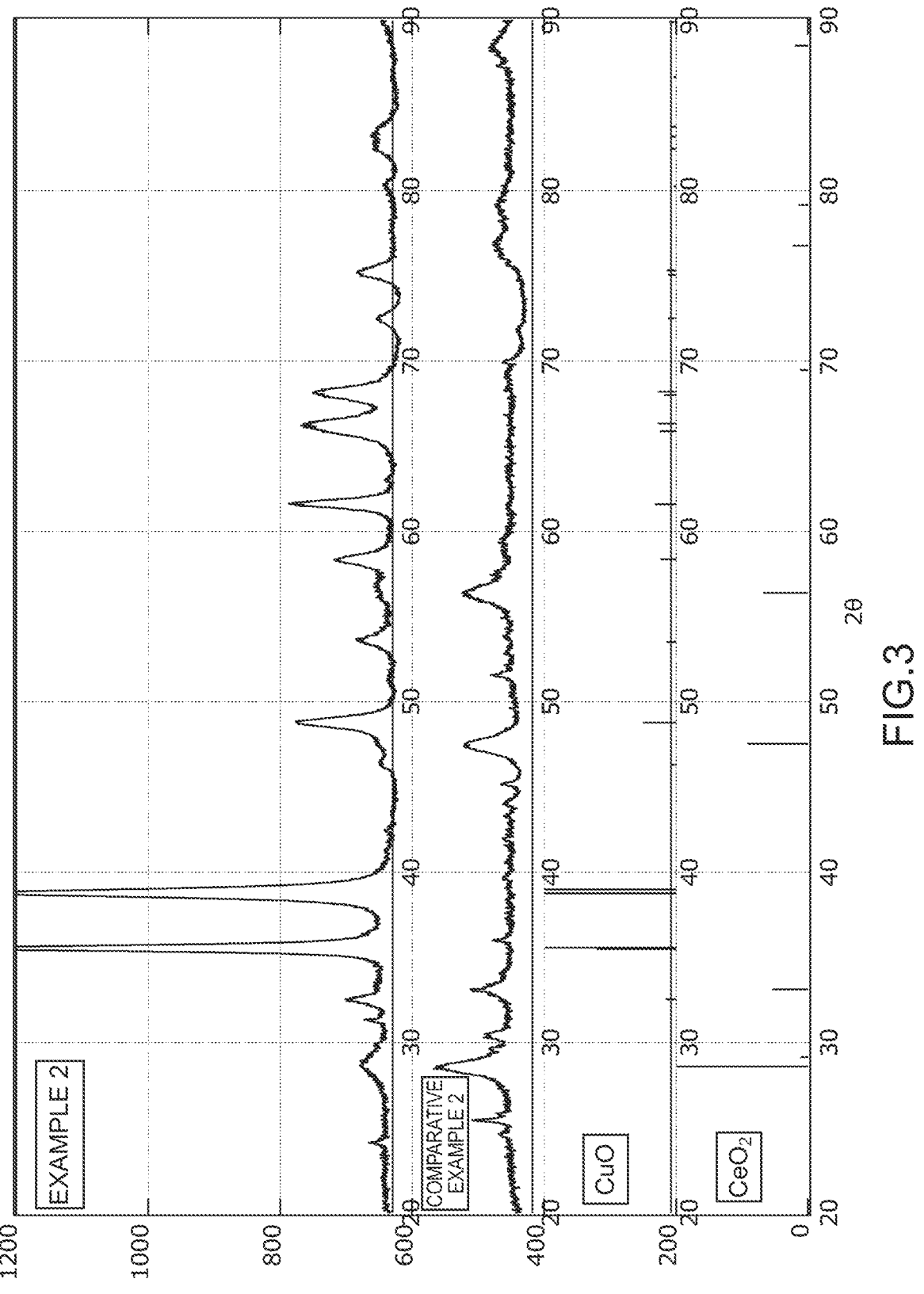
FIG. 3 shows the results of X-ray crystal structure analysis of nanocrystal composites after the first catalyst evaluation at 600° C. in Example 2 and Comparative Example 2.
Figure 4:
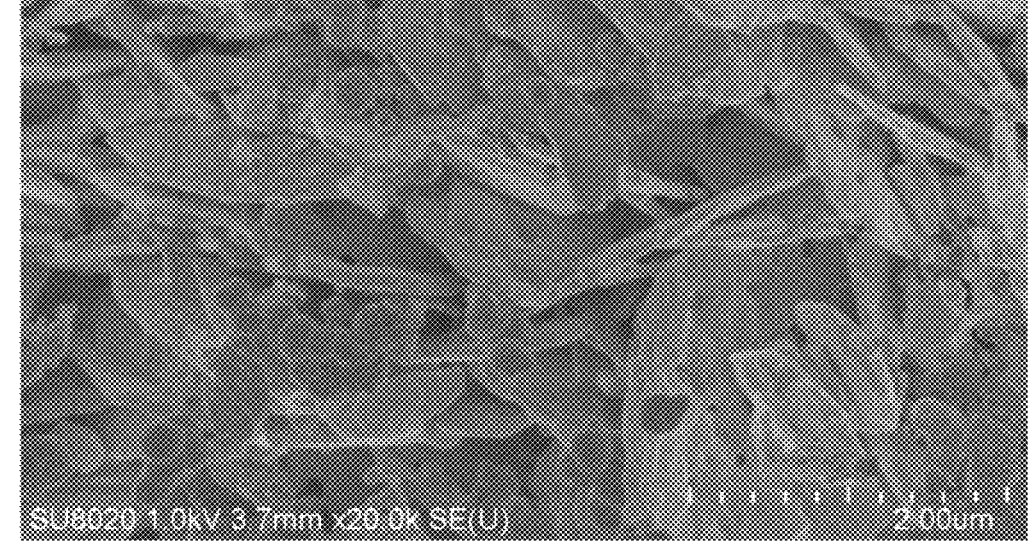
FIG. 4 is an SEM image obtained when nanocrystal composites after the first catalyst evaluation at 600° C. in Example 3 were observed at 20000× magnification.
Figure 5:
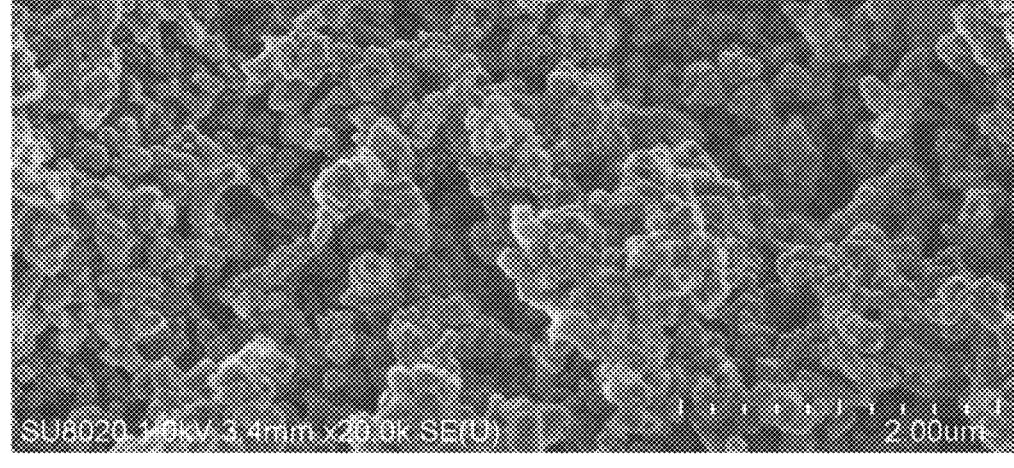
FIG. 5 is an SEM image obtained when nanocrystal composites after the first catalyst evaluation at 600° C. in Comparative Example 1 were observed at 20000× magnification.

In FIG. 3, the results of the X-ray crystal structure analysis of the nanocrystal composites after the first catalyst evaluation at 600° C. in Example 2 and Comparative Example 2 are shown. In FIGS. 4 and 5, the results of observation of nanocrystal composites whose crystal structure could be maintained and nanocrystal composites whose crystal structure could not be maintained and were decomposed, using a scanning electron microscope are shown, respectively. FIG. 4 is an SEM image obtained when the nanocrystal composites after the first catalyst evaluation at 600° C. in Example 3 were observed at 20000× magnification, and FIG. 5 is an SEM image obtained when the nanocrystal composites after the first catalyst evaluation at 600° C. in Comparative Example 1 was observed at 20000× magnification.

12 a peak of CuO and a peak of $CeO_2$ were observed. As shown in FIG. 2, even though the nanocrystal composites after the first catalyst evaluation at 600° C. in Example 2 was observed, the $CeO_2$ nanoparticles were dispersedly arranged on the nanocrystal composites, and moreover, a surface of the nanocrystal fragment, which was characteristic of the structure of the nanocrystal composites, could be confirmed. As shown in FIG. 4, when the nanocrystal composites after the first catalyst evaluation at 600° C. in Example 3 were observed, mixing of nanocrystal fragments of copper oxide (CuO) each having a surface and particulate cerium oxide

TABLE 1

| | Metal oxide | Raw material | Amount added g | Visual field area ratio % | Catalyst evaluation at 600° C. First | Second | Structure stability Crystal structure of nanocrystal composites after first catalyst evaluation at 600° C. |
|---|---|---|---|---|---|---|---|
| Example 1 | First kind | CuCl$_2$ dihydrate | 2.53 | 4 | ○ (100%) | ○ (97%) | ○ |
| | Second kind | Cerium (III) chloride heptahydrate | 0.06 | | | | |
| | | Urea | 2.71 | | | | |
| Example 2 | First kind | CuCl$_2$ dihydrate | 2.43 | 13 | ○ (90%) | ○ (91%) | ○ |
| | Second kind | Cerium (III) chloride heptahydrate | 0.28 | | | | |
| | | Urea | 2.75 | | | | |
| Example 3 | First kind | CuCl$_2$ dihydrate | 2.30 | 21 | ○ (84%) | ○ (84%) | ○ |
| | Second kind | Cerium (III) chloride heptahydrate | 0.56 | | | | |
| | | Urea | 2.79 | | | | |
| Example 4 | First kind | CuCl$_2$ dihydrate | 2.05 | 34 | ○ (61%) | ○ (62%) | ○ |
| | Second kind | Cerium (III) chloride heptahydrate | 1.12 | | | | |
| | | Urea | 2.88 | | | | |
| Comparative Example 1 | First kind | CuCl$_2$ dihydrate | 2.56 | 0 | ○ (100%) | × (30%) | × |
| | Second kind | Cerium (III) chloride heptahydrate | 0.00 | | | | |
| | | Urea | 2.70 | | | | |
| Comparative Example 2 | First kind | CuCl$_2$ dihydrate | 2.55 | 1 | ○ (100%) | × (40%) | × |
| | Second kind | Cerium (III) chloride heptahydrate | 0.01 | | | | |
| | | Urea | 2.70 | | | | |
| Comparative Example 3 | First kind | CuCl$_2$ dihydrate | 0.26 | 81 | × (20%) | — | — |
| | Second kind | Cerium (III) chloride heptahydrate | 5.03 | | | | |
| | | Urea | 3.51 | | | | |
| Comparative Example 4 | First kind | CuCl$_2$ dihydrate | 1.53 | 52 | × (48%) | — | — |
| | Second kind | Cerium (III) chloride heptahydrate | 2.24 | | | | |
| | | Urea | 3.06 | | | | |

In the nanocrystal composites obtained in Examples 1 to 4 shown in Table 1, the visual field area ratio was 2% or more and 50% or less, and the $CeO_2$ nanoparticles were favorably dispersed. As shown in Table 1, in Examples 1 to 4, the NO conversion rate was 50% or more in both of the first catalytic reaction and the second catalytic reaction, and high catalytic activity was maintained. On that account, the nanocrystal composites obtained in Examples 1 to 4 can be evaluated as those in which the $CeO_2$ nanoparticles are favorably dispersed without covering the surfaces of the nanocrystal fragments formed of CuO that is effective for the catalytic reaction.

In each of Examples 1 to 4, furthermore, a peak of CuO could be confirmed in the X-ray crystal structure analysis of the nanocrystal composites after the catalyst evaluation, but on the other hand, a peak of Cu and a peak of $Cu_2O$ were not observed, and therefore, the nanocrystal composites exhibited good structure stability. As a more specific result, it can be seen from FIG. 3 that decomposition of CuO was suppressed by the $CeO_2$ nanoparticles in Example 2 because ($CeO_2$ nanoparticles) can be confirmed. From this, it can be confirmed that in the nanocrystal composites obtained in Examples 1 to 4, the crystal structure of copper oxide is maintained, and the morphology is maintained.

On the other hand, in Comparative Examples 1 and 2 shown in Table 1, the NO conversion rate in the catalytic reaction of the first time was 50% or more, but the NO conversion rate in the catalytic reaction of the second time was less than 50%, so that high catalytic activity could not be maintained. Furthermore, in the X-ray crystal structure analysis after the catalyst evaluation, a peak of CuO was not observed, and therefore, it can be understood that the surface of the nanocrystal fragment formed of CuO that was effective for the catalytic reaction was lost by the decomposition of CuO, so that high catalytic activity could not be maintained. As a more specific result, in FIG. 3, regarding Comparative Example 2, a peak of CuO is not observed, and decomposition of CuO can be confirmed. As shown in FIG. 5, moreover, when the nanocrystal composites after the first catalyst evaluation at 600° C. in Comparative Example 1 were observed, a surface of the nanocrystal fragment, which was characteristic of the structure of the nanocrystal composites, could not be confirmed. From this, it can be confirmed that in the nanocrystal composites obtained in Comparative Examples 1 and 2, decomposition of CuO occurred, so that the crystal structure of CuO cannot be maintained, and the morphology collapses.

In Comparative Examples 3 and 4, the visual field area ratio was not in the range of 2% to 50%, the NO conversion rate in the catalytic reaction of the first time was less than 50%, and high catalytic performance was not obtained. On that account, in Comparative Examples 3 and 4, the catalytic performance after the catalytic reaction of the second time was not evaluated.

From the above, the nanocrystal composites according to the present disclosure, which are described in Examples 1 to 4, can be judged to be able to favorably maintain morphology, crystal structure and high catalytic activity of the catalytically active plane even if they are repeatedly exposed to a high temperature. On that account, the nanocrystal composite according to the present disclosure is found to be useful particularly for the catalytic reaction in purification of harmful gases contained in exhaust gas of automobiles.

What is claimed is:

1. A nanocrystal composite comprising a connected aggregate including a plurality of nanocrystal fragments connected to one another, each nanocrystal fragment having a main surface and an end surface, and nanoparticles supported on the connected aggregate, wherein the plurality of nanocrystal fragments each have a flaky shape;

the plurality of nanocrystal fragments have gaps between the main surfaces;

the gaps are arranged so as to open to the outside of the connected aggregate, wherein the nanoparticles are supported in the gaps;

the nanoparticles have a metallic element different from that of the plurality of nanocrystal fragments; and a proportion of a visual field area of the nanoparticles with respect to a visual field area of the plurality of nanocrystal fragments is 2% or more and 50% or less, wherein the visual field area of the plurality of nanocrystal fragments is an area in the visual field when the plurality of nanocrystal fragments are observed by a microscope, wherein the visual field area of the nanoparticles is an area in the visual field when the nanoparticles are observed by the microscope, wherein the proportion is calculated based on an elemental mapping of the plurality fragments and the nanoparticles of nanocrystal using SEM-EDS, wherein the minimum dimension of the main surface of the nanocrystal fragment is 10 nm or more and less than 1 $\mu m$, and the thickness t of the nanocrystal fragment is $\frac{1}{10}$ or less of the minimum dimension of the main surface, wherein the thickness t of the nanocrystal fragment is 1 nm or more, wherein the plurality of nanocrystal fragments are a first kind metal oxide and the nanoparticles are a second kind metal oxide different from the first kind metal oxide, wherein the nanoparticles are dispersedly present in a proportion of 1 to 2 particles with respect to 20 nanocrystal fragments, and wherein the second kind metal oxide comprises a nanoparticle of a mixture of cerium oxide and zirconium oxide, wherein the nanoparticles are present in said proportion between the nanocrystal fragments.

2. The nanocrystal composite according to claim 1, wherein the first kind metal oxide is copper oxide.

3. The nanocrystal composite according to claim 1, wherein the second kind metal oxide further comprises a cerium oxide nanoparticle.

4. The nanocrystal composite according to claim 1, for application in oxidation-reduction catalytic reaction.

5. The nanocrystal composite according to claim 1, for application as a catalyst for exhaust gas purification.

* * * * *